United States Patent
Kobayashi et al.

(10) Patent No.: US 10,760,497 B2
(45) Date of Patent: Sep. 1, 2020

(54) GAS TURBINE STARTING DEVICE AND GAS TURBINE SYSTEM

(71) Applicant: MITSUBISHI HEAVY INDUSTRIES COMPRESSOR CORPORATION, Tokyo (JP)

(72) Inventors: Masahiro Kobayashi, Hiroshima (JP); Yasushi Mori, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 260 days.

(21) Appl. No.: 15/551,999

(22) PCT Filed: Feb. 23, 2015

(86) PCT No.: PCT/JP2015/055067
§ 371 (c)(1),
(2) Date: Aug. 18, 2017

(87) PCT Pub. No.: WO2016/135831
PCT Pub. Date: Sep. 1, 2016

(65) Prior Publication Data
US 2018/0038283 A1 Feb. 8, 2018

(51) Int. Cl.
*F02C 7/275* (2006.01)
*F02C 7/36* (2006.01)
(Continued)

(52) U.S. Cl.
CPC .............. *F02C 7/275* (2013.01); *F01D 15/08* (2013.01); *F01D 15/12* (2013.01); *F02C 7/32* (2013.01);
(Continued)

(58) Field of Classification Search
CPC . F02C 7/32; F01D 15/08; F01D 15/12; F01D 19/00; F01D 25/34; F01D 25/36; F05D 2260/40311
See application file for complete search history.

(56) References Cited

U.S. PATENT DOCUMENTS

| 2,845,776 A | 8/1958 | Traupel |
| 4,452,043 A | 6/1984 | Wallace |

(Continued)

FOREIGN PATENT DOCUMENTS

| GB | 846358 A | * 8/1960 | ................ F02C 7/00 |
| JP | 57-41427 A | 3/1982 | |

(Continued)

OTHER PUBLICATIONS

International Search Report and Written Opinion of the International Searching Authority (Forms PCT/ISA/210 and PCT/ISA/237) issued in International Application No. PCT/JP2015/055067 dated Apr. 28, 2015, together with English translation.

*Primary Examiner* — David E Sosnowski
*Assistant Examiner* — Danielle M. Christensen
(74) *Attorney, Agent, or Firm* — Birch, Stewart, Kolasch & Birch, LLP

(57) ABSTRACT

Provided is a gas turbine starting device which has a sun gear, a planetary carrier, an internal gear, and a planetary gear, the sun gear, the planetary carrier and the internal gear serving as rotating bodies rotating about an axis; and a variable speed power source which has a rotor connected to one of the rotating bodies in the planetary gear mechanism. A rotating shaft of the gas turbine is connected to one of the rotating bodies other than the rotating body to which the variable speed power source is connected, and the rotating shaft of the compressor is connected to the remaining one of the rotating bodies other than the rotating bodies to which the rotor of the variable speed power source and the rotating shaft of the gas turbine are connected.

5 Claims, 4 Drawing Sheets

(51) Int. Cl.
   *F01D 15/12* (2006.01)
   *F01D 15/08* (2006.01)
   *F02C 7/32* (2006.01)
   *F16H 1/28* (2006.01)

(52) U.S. Cl.
   CPC ...... *F02C 7/36* (2013.01); *F05D 2260/40311* (2013.01); *F16H 1/28* (2013.01)

(56) References Cited

U.S. PATENT DOCUMENTS

| | | |
|---|---|---|
| 6,463,740 B1 | 10/2002 | Schmidt et al. |
| 6,555,927 B1 | 4/2003 | Suzuki et al. |
| 8,814,746 B2 * | 8/2014 | Fox ..................... F16H 1/2836 475/331 |
| 2003/0064847 A1 | 4/2003 | Oshidari et al. |
| 2005/0113201 A1 | 5/2005 | Kimura et al. |
| 2006/0264296 A1 | 11/2006 | Moeller |
| 2011/0094241 A1 * | 4/2011 | Rodd ..................... F01D 19/00 60/778 |

FOREIGN PATENT DOCUMENTS

| | | |
|---|---|---|
| JP | 2001-152901 A | 6/2001 |
| JP | 2002-155760 A | 5/2002 |
| JP | 2003-34153 A | 2/2003 |
| JP | 2390871 A | 1/2004 |
| JP | 2004-506116 A | 2/2004 |
| JP | 2006-521517 A | 9/2006 |
| JP | 4472350 B2 | 6/2010 |

* cited by examiner

GAS TURBINE STARTING DEVICE AND GAS TURBINE SYSTEM

TECHNICAL FIELD

The present invention relates to a gas turbine starting device which starts a gas turbine, and a gas turbine system including the gas turbine starting device.

BACKGROUND ART

A gas turbine is generally used as a prime mover which extracts rotational power. For example, a gas turbine forming a gas turbine system capable of generating electricity or compressed gas by connection of a driving object such as a generator or a LNG liquefying compressor for generating a liquefied natural gas or the like is known.

As the gas turbine system, there are a biaxial type in which a rotating shaft of a driving target and an output shaft of a gas turbine are disposed on different axes, and a uniaxial type in which the rotating shaft and the output shaft are disposed on the same axis.

The uniaxial gas turbine system has a simpler structure than the biaxial type, and has advantages such as an easy operation.

Incidentally, when starting the operation of the gas turbine system, a starting device is used to ignite and start up the gas turbine. As disclosed in, for example, Patent Literature 1, the starting device is also used for starting an engine of an automobile, and the starting device is a device indispensable for performing the self-sustained operation of the prime mover.

CITATION LIST

Patent Literature

[Patent Literature 1]
Japanese Unexamined Patent Application, First Publication No. 2001-152901

SUMMARY OF INVENTION

Technical Problem

However, when starting the gas turbine in the uniaxial gas turbine system, in a case where the driving target connected to the gas turbine is, for example, a fluid machine such as a LNG liquefying compressor, until the fluid machine reaches the rated rotational speed, since the fluid machine has a load corresponding to the revolving speed, the starting device also needs to bear the load of the fluid machine. Therefore, there are problems of complexity of the starting device and increases in size and cost.

The present invention provides a gas turbine starting device and a gas turbine system which have a simple structure and are capable of reducing size and cost.

A gas turbine starting device according to a first aspect of the present invention includes a planetary gear mechanism which is provided in a gas turbine system having a gas turbine, and a fluid machine rotationally driven by a driving force of the gas turbine on the same axis as a rotation center of a rotating shaft of the gas turbine, and has a sun gear, a planetary carrier disposed on an outer circumferential side of the sun gear, an internal gear disposed on an outer circumferential side of the planetary carrier, and a planetary gear which is supported by the planetary carrier and meshes with the sun gear and the internal gear, the sun gear, the planetary carrier and the internal gear serving as rotating bodies rotating about the axis; and a variable speed power source which has a driving shaft connected to rotate one of the rotating bodies in the planetary gear mechanism about the axis, wherein the rotating shaft of the gas turbine is connected to rotate one of the rotating bodies other than the rotating body, to which the variable speed power source is connected, about the axis, and a rotating shaft of the fluid machine is connected so that the remaining one of the rotating bodies other than the rotating bodies, to which the driving shaft of the variable speed power source and the rotating shaft of the gas turbine are connected, is rotated about the axis.

According to such a gas turbine starting device, at the time of starting the gas turbine, first, the rotating body, to which the variable speed power source in the planetary gear mechanism is connected, is rotated by the variable speed power source. At this time, the rotating body in the planetary gear mechanism, to which the rotating shaft of the fluid machine is connected, is in a state of being hard to rotate by the load of the fluid machine. As a result, the rotating body in the planetary gear mechanism to which the rotating shaft of the gas turbine is connected starts to rotate with the rotation of the rotating body provided with the driving shaft of the variable speed driving source. That is, it is possible to rotate the rotating shaft of the gas turbine with the variable speed power source, using the planetary gear mechanism, without rotating the rotating shaft of the fluid machine or at a low rotational speed, and the gas turbine can be started.

Further, the gas turbine starting device according to a second aspect of the present invention may further include a stopper which regulates rotation of the rotating body to which the rotating shaft of the fluid machine is connected, until the rotational speed of the rotating shaft of the gas turbine in the first aspect becomes equal to or higher than a self-sustained rotational speed of the gas turbine.

By providing the stopper in this manner, it is possible to regulate the rotation of the fluid machine until the gas turbine becomes the self-sustained rotational speed or more. Therefore, only the revolving speed of the gas turbine can be increased by the variable speed power source, without rotating the fluid machine, until the gas turbine can perform the self-sustained operation. Therefore, at the time of starting the gas turbine, it is possible to further reduce the burden of the gas turbine starting device on the load of the fluid machine.

Further, the gas turbine system according to a third aspect of the present invention includes the gas turbine starting device according to the first or second aspect, a gas turbine started by the gas turbine starting device, and a fluid machine driven by driving force of the gas turbine.

According to such a gas turbine system, since the gas turbine starting device using the planetary gear mechanism is provided, the rotating shaft of the gas turbine can be rotated by the variable speed power source without rotating the rotating shaft of the fluid machine or at a low revolving speed, and the gas turbine can be started.

Further, in the gas turbine system according to a fourth aspect of the present invention, a rotation center of the rotating body in the planetary gear mechanism, a rotation center of the rotating shaft of the gas turbine, and a rotation center of the rotating shaft of the fluid machine may be disposed on the same axis in the third aspect.

By disposing the gas turbine, the planetary gear mechanism, and the fluid machine on the same axis in this way, the gas turbine system can be compactly designed and space reduction can be achieved.

Further, in the gas turbine system according to a fifth aspect of the present invention, the rotation center of the driving shaft of the variable speed power source and the rotation center of the rotating body in the planetary gear mechanism may be disposed on the same axis in the fourth aspect.

By disposing the gas turbine, the planetary gear mechanism, the fluid machine, and the variable speed power source on the same axis in this way, the gas turbine system can be further compactly designed, and further space reduction can be achieved.

Further, in the gas turbine system according to a sixth aspect of the present invention, the planetary gear mechanism and the variable speed power source may be disposed between the gas turbine and the fluid machine in the fifth aspect.

By disposing the planetary gear mechanism and the variable speed power source at such positions, the gas turbine system can be designed more compactly and further space reduction can be achieved.

Advantageous Effects of Invention

According to the gas turbine starting device and the gas turbine system, by utilizing a planetary gear mechanism, the structure can be simplified and the size and cost can be reduced.

DESCRIPTION OF EMBODIMENTS

First Embodiment

Hereinafter, a gas turbine system 1 according to an embodiment of the present invention will be described.

Figure 1:
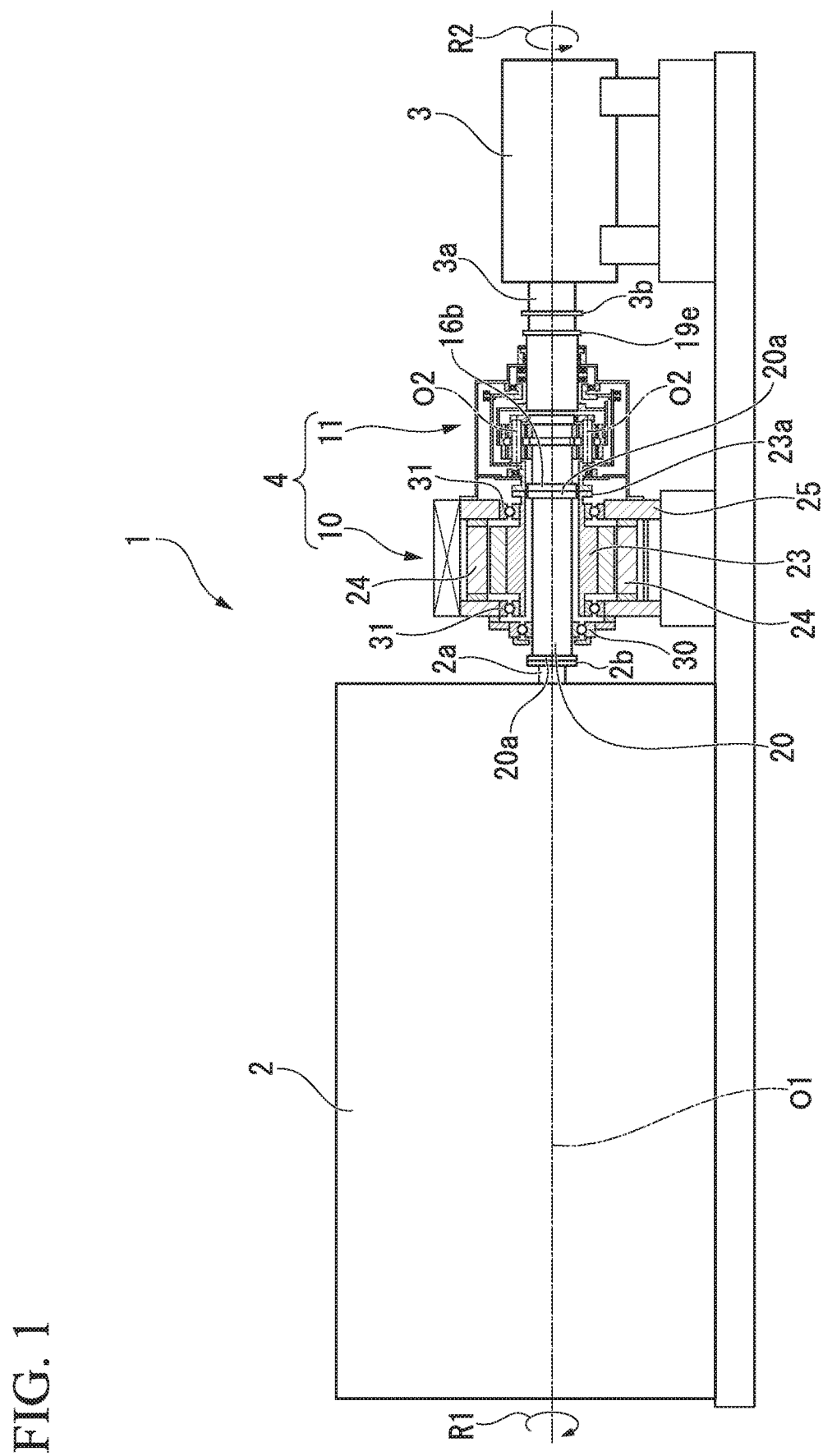
FIG. 1 is an overall schematic side view of a gas turbine system according to a first embodiment of the present invention.

As illustrated in FIG. 1, the gas turbine system 1 includes a gas turbine 2 which combusts fuel to obtain rotational driving force, a compression device 3 (fluid machine) rotationally driven by the rotational force of the gas turbine 2, and a gas turbine starting device 4 which starts the gas turbine 2.

Although not illustrated in detail, the gas turbine 2 includes a compressor which generates compressed air, a combustor which mixes and combusts the compressed air and fuel to generate combustion gas, and a turbine rotationally driven by the combustion gas.

Further, the gas turbine 2 includes a rotating shaft 2a that rotates about an axis O1, and is capable of extracting rotational force from the rotating shaft 2a. A flange portion 2b which protrudes annularly outward in the radial direction is formed at an end portion of the rotating shaft 2a on one side in the direction of the axis O1 (an end portion on the compression device 3 side).

The compression device 3 is a device that includes a rotating shaft 3a rotating about the axis O1 and compresses, for example, gas such as air or LNG On the rotating shaft 3a, a flange portion 3b protruding annularly outward in the radial direction is formed at a position close to an end portion on the other side in the direction of the axis O1 (an end portion on the gas turbine 2 side).

That is, the compression device 3 is provided so that the rotating shaft 3a of the compression device 3 and the rotating shaft 2a of the gas turbine 2 are disposed on the same axis O1.

A gas turbine starting device 4 (hereinafter simply referred to as a starting device 4) is a device which is provided between the gas turbine 2 and the compression device 3 so as to be sandwiched in the direction of the axis O1 and starts the gas turbine 2.

The starting device 4 includes a planetary gear mechanism 11 having a plurality of rotating bodies 12, a variable speed power source 10 which rotates one of the rotating bodies 12 in the planetary gear mechanism 11, and a stopper 5 capable of regulating the rotational driving of the compression device 3.

Figure 2:
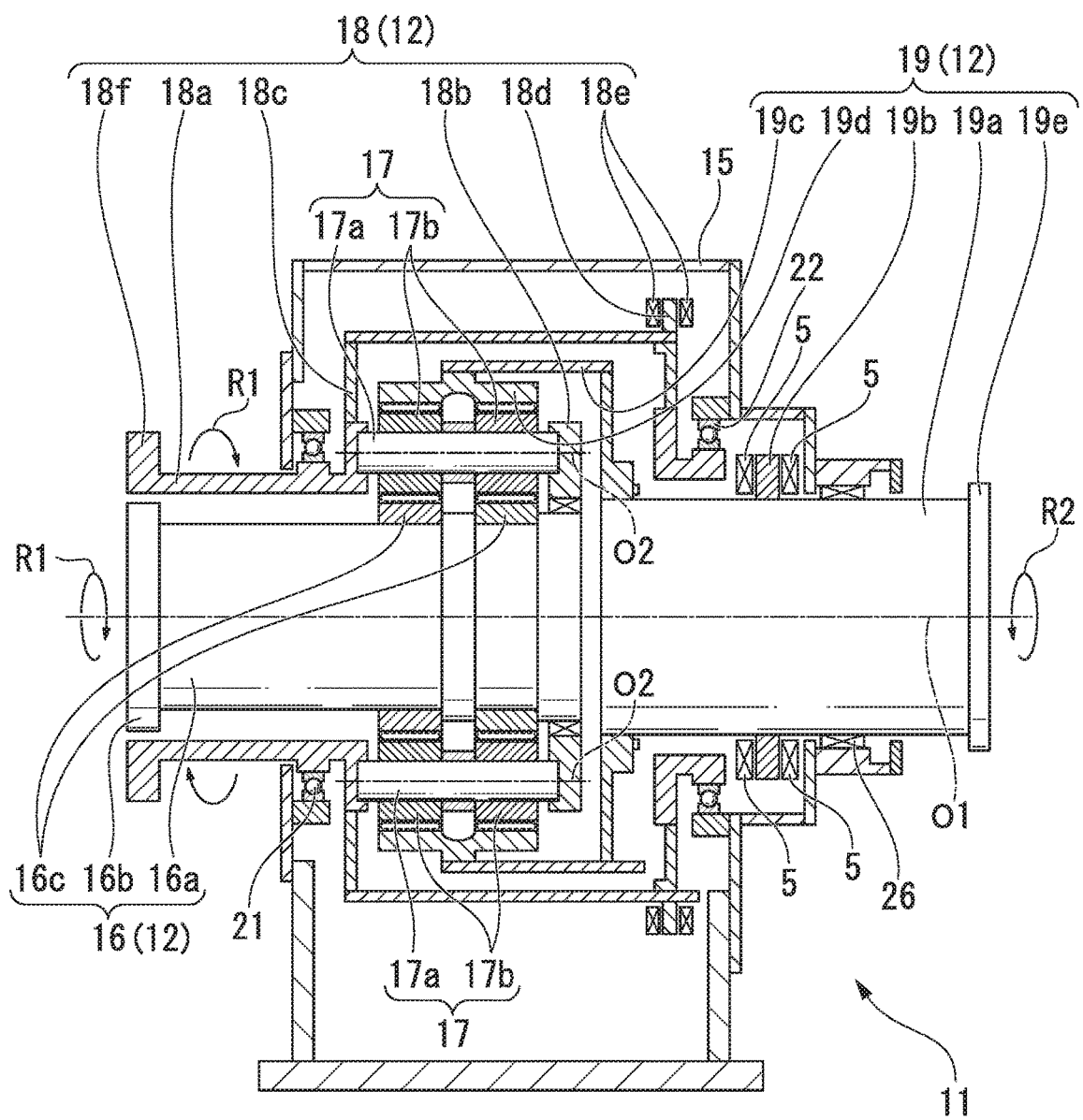
FIG. 2 is an enlarged side view illustrating a planetary gear mechanism in the gas turbine system according to the first embodiment of the present invention.

As illustrated in FIG. 2, the planetary gear mechanism 11 includes a plurality of rotating bodies 12 which rotate about the axis O1, a planetary gear 17 supported by the plurality of rotating bodies 12, and a casing 15 which supports the rotating bodies 12 and the planetary gear 17.

The plurality of rotating bodies 12 are a sun gear 16 that rotates about the axis O1, a planetary carrier 18 disposed on the outer circumferential side of the sun gear 16, and an internal gear 19 disposed on the outer circumferential side of the planetary carrier 18.

The sun gear 16, which is one of the rotating bodies 12, has a shaft unit 16a having a columnar shape centered on the axis O1 and extending toward the rotating shaft 2a of the gas turbine 2, and a gear unit 16c integrally provided on the outer circumferential surface of the shaft unit 16a.

A flange portion 16b is formed at an end portion of the shaft unit 16a on the other side in the direction of the axis O1 (an end portion on the gas turbine 2 side).

Further, as illustrated in FIG. 1, the shaft unit 16a is provided with a columnar connecting shaft 20 disposed between the shaft unit 16a and the rotating shaft 2a of the gas turbine 2 to connect the shaft unit 16a and the rotating shaft 2a.

Flange portions 20a are formed on both ends of the connecting shaft 20 in the direction of the axis O1 and are coupled to the flange portion 16b of the shaft unit 16a and the flange portion 2b of the rotating shaft 2a of the gas turbine 2, respectively. As a result, the rotation of the sun gear 16 is transmitted to the gas turbine 2.

Here, the flange portion 16b of the sun gear 16 and the flange portion 20a of the connecting shaft 20 may not be provided, and the sun gear 16 and the connecting shaft 20 may be integrated.

Furthermore, the gear unit 16c is provided on the shaft unit 16a at an end portion on one side in the direction of the axis O1 (an end portion on the compression device 3 side).

The planetary gear 17 is disposed on the outer circumferential side of the gear unit 16c of the sun gear 16. Each planetary gear 17 has a columnar shaft unit 17a extending in the direction of the axis O1, and a gear unit 17b integrally provided on the outer circumferential surface of the shaft unit 17a.

The gear unit 17b of the planetary gear 17 meshes with the gear unit 16c of the sun gear 16.

The planetary carrier 18, which is one of the rotating bodies 12, is an annular member centered on the axis O1, and sandwiches and supports the planetary gear 17 from both sides in the direction of the axis O1.

More specifically, the planetary carrier 18 has a tubular portion 18a having a cylindrical shape which extends to the same position as the shaft unit 16a of the sun gear 16 on the other side in the direction of the axis O1 and supports the shaft unit 17a of the planetary gear 17 on the other side, and a disk-like portion 18b which supports the shaft unit 17a of the planetary gear 17 on one side in the direction of the axis O1. Further, the planetary carrier 18 has a large-diameter tubular portion 18c having a cylindrical shape which is connected to an end portion on one side of the tubular portion 18a in the direction of the axis O1 and covers the planetary gear 17 from the outer circumferential side.

The planetary carrier 18 revolves the respective planetary gears 17 about the axis O1 around the sun gear 16, while rotating the shaft unit 17a of the planetary gear 17 about the rotation axis O2 of the shaft unit 17a itself.

A flange portion 18f protruding annularly from the outer circumferential surface outward in the radial direction is formed at the end portion on the other side of the tubular portion 18a in the direction of the axis O1.

An annular protrusion 18d protruding annularly from the outer circumferential surface outward in the radial direction is formed at a position near the end portion of the large-diameter tubular portion 18c on one side in the direction of the axis O1.

The annular protrusion 18d is provided with a planetary carrier stopper 18e. The planetary carrier stopper 18e is capable of sandwiching the annular protrusion 18d from both sides in the direction of the axis O1, regulates the rotation of the large-diameter tubular portion 18c and regulates the rotation of the entire planetary carrier 18.

The internal gear 19, which is one of the rotating bodies 12, has a gear unit 19d which is disposed on the outer circumferential side of the planetary gear 17 to mesh with the gear unit 17b of the planetary gear 17 from the outer circumferential side and is rotatable about the axis O1, and a support unit 19c which rotates about the axis O1 together with the gear unit 19d to cover the gear unit 19d from the outer circumferential side. Further, the internal gear 19 has a shaft unit 19a that rotates about the axis O1 together with the gear unit 19d and the support unit 19c.

The gear unit 19d has a cylindrical shape centered on the axis O1, and teeth meshing with the gear unit 17b of the planetary gear 17 are formed on the inner circumferential surface of the gear unit 19d. The gear unit 19d is disposed between the planetary gear 17 and the large-diameter tubular portion 18c of the planetary carrier 18 so as to be sandwiched between the planetary gear 17 and the large-diameter tubular portion 18c from inside and outside in the radial direction.

The support unit 19c has a cylindrical shape with a diameter larger than the gear unit 19d and is connected to the gear unit 19d. Further, the support unit 19c is disposed between the gear unit 19d and the large-diameter tubular portion 18c of the planetary carrier 18 so as to be sandwiched between the gear unit 19d and the large-diameter tubular portion 18c from inside and outside in the radial direction.

The shaft unit 19a has a columnar shape, is disposed to be spaced apart from the shaft unit 16a on one side in the direction of the axis O1 on the same axis O1 as the shaft unit 16a of the sun gear 16 and is connected to the support unit 19c to rotate with the support unit 19c.

A flange portion 19e is formed on the shaft unit 19a at end portion on one side in the direction of the axis O1. The flange portion 19e is connected to the rotating shaft 3a of the compression device 3, and the rotational force of the internal gear 19 is transmitted to the compression device 3. An annular protrusion 19b protruding annularly from the outer circumferential surface outward in the radial direction is formed on the shaft unit 19a at an intermediate position in the direction of the axis O1.

The casing 15 supports each of the rotating bodies 12 of the planetary gear mechanism 11 from the outer circumferential side.

More specifically, the casing 15 has a bearing 21 provided between the casing 15 and the outer circumferential surface of the tubular portion 18a of the planetary carrier 18, and a bearing 22 provided at the end portion of the large-diameter tubular portion 18c of the planetary carrier 18 on one side in the direction of axis O1. By the bearings 21 and 22, the planetary carrier 18 is supported by the casing 15 so that the planetary carrier 18 can rotate with respect to the casing 15.

Further, the casing 15 has a bearing 26 provided between the casing 15 and the outer circumferential surface of the shaft unit 19a of the internal gear 19. With the bearing 26, the internal gear 19 is supported by the casing 15 so that the internal gear 19 can rotate with respect to the casing 15.

Further, the casing 15 supports the internal gear 19 so that the shaft unit 19a of the internal gear 19 protrudes to one side in the direction of the axis O1. Further, the casing 15 supports the planetary carrier 18 and the sun gear 16 so that the tubular portion 18a of the planetary carrier 18 and the shaft unit 16a of the sun gear 16 protrude to the other side of the axis O1.

The variable speed power source 10 is, for example, a variable speed motor capable of suitably changing the rotational speed. As illustrated in FIG. 1, the variable speed power source 10 is disposed between the gas turbine 2 and the planetary gear mechanism 11.

More specifically, the variable speed power source 10 has a rotor 23 (driving shaft) which covers the connecting shaft 20 from the outer circumferential side, a stator 24 facing in the radial direction on the outer circumferential side of the rotor 23, and a power source casing 25 that fixes the stator 24 to the inner circumferential surface and covers the stator 24 from the outer circumferential side.

The rotor 23 has a cylindrical shape centered on the axis O1 and has a conductor, and a flange portion 23a protruding annularly from the outer circumferential surface outward in the radial direction is formed at an end portion on one side in the direction of the axis O1. The flange portion 23a and the flange portion 18f of the tubular portion 18a of the planetary carrier 18 are connected to each other so that the rotational force of the rotor 23 is transmitted to the planetary carrier 18.

Here, instead of providing the flange portion 23a and the flange portion 18f, the rotor 23 and the planetary carrier 18 may be gear-coupled by splines.

The stator 24 is formed of a plurality of coils and is disposed to be spaced apart from the rotor 23 in the radial direction.

The power source casing 25 fixes the stator 24 to the radially inner side, and is fixed to the casing 15 of the planetary gear mechanism 11 at an end portion on one side in the direction of the axis O1. Further, the power source casing 25 has a bearing 30 provided between the power source casing 25 and the outer circumferential surface of the connecting shaft 20 at the end portion on the other side in the direction of the axis O1, and supports the connecting shaft 20 in a rotatable manner.

Further, the power source casing 25 has a pair of bearings 31 provided between the power source casing 25 and the outer circumferential surface of the rotor 23 at both end portions in the direction of the axis O1 and on one side in the direction of the axis O1 as compared to the bearing 30 to support the rotor 23 in a rotatable manner.

The stopper 5 is capable of sandwiching the annular protrusion 19b formed on the shaft unit 19a of the internal gear 19 from both sides in the direction of the axis O1, and regulates the rotation of the shaft unit 19a to regulate the rotation of the entire internal gear 19.

As described above, according to the configuration of the present embodiment, the rotation center of each rotating body 12 of the planetary gear mechanism 11, the rotation center of the rotating shaft 2a of the gas turbine 2, the rotation center of the rotating shaft 3a of the compression device 3, and the rotation center of the rotor 23 of the variable speed power source 10 are disposed on the same axis O1.

Next, referring to FIG. 3, the change in the revolving speed of each constituent element from the time of starting the gas turbine system 1 will be described.

First, the variable speed power source 10 is driven to increase the revolving speed. At this time, the rotational force is transmitted from the rotor 23 of the variable speed power source 10 to the tubular portion 18a of the planetary carrier 18, the planetary carrier 18 rotates about the axis O1, and the revolving speed increases.

Hereinafter, the rotation direction of the planetary carrier 18 will be defined as a normal direction R1.

At this time, the planetary carrier stopper 18e is in a released state (a state in which rotation is not regulated), and the stopper 5 is in a regulated state (state in which rotation is regulated).

When the planetary carrier 18 rotates, the planetary gear 17 revolves around the sun gear 16 about the axis O1, while rotating about the rotation axis O2. As a result, the sun gear 16 and the connecting shaft 20 rotate in the normal direction R1, and the rotating shaft 2a of the gas turbine 2 also rotates in the normal direction R1.

The gas turbine 2 is ignited at a certain revolving speed, and even thereafter, the variable speed power source 10 is driven to increase the revolving speed of the gas turbine 2. Here, at the ignition revolving speed of the gas turbine 2, the revolving speed of the variable speed power source 10 is maintained for a certain period of time. After checking that the ignition is reliably performed, the variable speed power source 10 may be driven to increase the revolving speed of the gas turbine 2.

Figure 3:
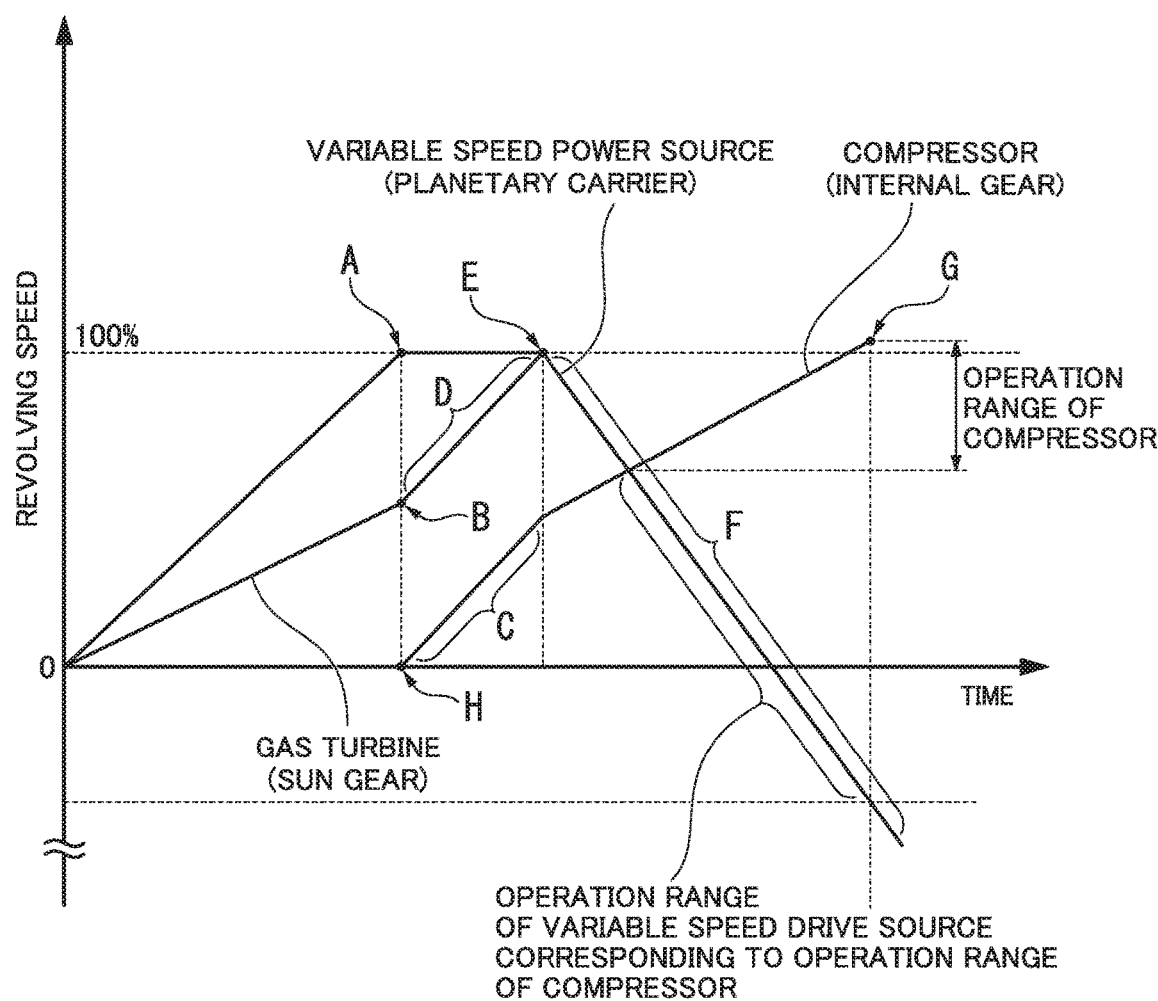
FIG. 3 is a graph illustrating a time change in the rotational state (revolving speed) of each constituent element in the gas turbine system according to the first embodiment of the present invention.

Thereafter, the revolving speed of the variable speed power source 10 is increased until the rotational speed of the rotating shaft 2a of the gas turbine 2 reaches the self-sustained rotational speed of the gas turbine 2 (point A in FIG. 3). When the gas turbine 2 reaches the self-sustained rotational speed (point 13 in FIG. 3), the revolving speed of the variable speed power source 10 is kept constant for a predetermined time.

When the gas turbine 2 reaches the self-sustained rotational speed (see a self-sustained rotation region D of FIG. 3), since a revolving speed control device (not illustrated) provided in the gas turbine 2 increases the revolving speed of the compression device 3, the revolving speed of the gas turbine 2 is increased to match a certain revolving speed of the compression device 3. At this time, by setting the stopper 5 in the release state at the timing (point H of FIG. 3) at which an increase in the revolving speed of the compression device 3 is started, the rotating shaft 3a of the compression device 3 is in a rotatable state, the compression device 3 starts up, and the revolving speed of the compression device 3 increases (region C of FIG. 3). At this time, the rotating shaft 3a of the compression device 3 rotates in a reverse direction R2.

Here, the revolving speed adjustment of the variable speed power source 10 may be controlled by a control device (not illustrated) or manually.

Thereafter, when the revolving speed of the gas turbine 2 reaches a steady operation state (point E of FIG. 3), the rotating shaft 2a maintains the state of rotating in the normal direction R1 at a constant revolving speed.

When the revolving speed of the gas turbine 2 reaches a steady operation state, the revolving speed of the variable speed power source 10 is gradually decreased, and the revolving speed of the compression device 3 is further increased.

Here, in the variable speed power source 10, the revolving speed may be decreased, and the rotation may be shifted to the reverse direction R2 from the normal direction R1 to increase the revolving speed of the compression device 3 (see a region F of FIG. 3).

As described above, when the revolving speed of the gas turbine 2 is in the steady operation state, by gradually decreasing the revolving speed of the variable speed power source 10 or setting to the reverse direction R2, the revolving speed of the compression device 3 can be brought to a certain revolving speed or the maximum revolving speed (point G of FIG. 3). In this way, the start of the gas turbine system 1 is completed.

Here, by changing the revolving speed of the variable speed power source 10 while the revolving speed of the gas turbine 2 is in a steady state, it is possible to operate the compression device 3 at a variable revolving speed at an arbitrary revolving speed within a certain revolving speed range.

Further, when the revolving speed of the variable speed power source 10 shifts from the normal direction R1 to the reverse direction R2, or when the revolving speed shifts from the reverse direction R2 to the normal direction R1, or when the revolving speed is held in the vicinity of the revolving speed of zero, in some cases, it is difficult to control the revolving speed. In this case, by setting the planetary carrier stopper 18e in the regulated state, the revolving speed of the variable speed power source 10 may be set to zero.

As described above, in the gas turbine system 1 of the present embodiment, since the planetary gear mechanism 11 is used in the starting device 4, until the self-sustained rotational speed of the gas turbine 2, the rotational force of the variable speed power source 10 can be transmitted only to the gas turbine 2, without being used as the rotational force of the compression device 3.

More specifically, when starting the gas turbine 2, by rotating the planetary carrier 18 using the variable speed power source 10 of the planetary gear mechanism 11, the sun gear 16 can be rotated, and the rotation of the rotating shaft 2a of the gas turbine 2 can be started.

At this time, by regulating the rotation of the shaft unit 19a of the internal gear 19 using the stopper 5, it is possible to regulate the rotation of the rotating shaft 3a of the compression device 3, until the gas turbine 2 reaches the self-sustained rotational speed or higher. Therefore, until the gas turbine 2 is capable of performing the self-sustained operation, the revolving speed of the gas turbine 2 can be increased by the variable speed power source 10, without rotating the compression device 3.

In this way, only the rotating shaft 2a of the gas turbine 2 can be rotated by the variable speed power source 10, using the planetary gear mechanism 11, without rotating the rotating shaft 3a of the compression device 3. Therefore, it is unnecessary to bear the load of the compression device 3 by the variable speed power source 10 at the time of starting the gas turbine 2. Therefore, even if the output of the variable speed power source 10 is kept small, the gas turbine 2 can be started.

Therefore, by using the planetary gear mechanism 11 for the starting device 4, it is possible to reduce the size of the variable speed power source 10, while simplifying the structure, it is possible to simplify the structure of the starting device 4, and reduce the size and the cost.

Furthermore, by disposing the rotating shaft 2a of the gas turbine 2, the rotating bodies 12 of the planetary gear mechanism 11, the rotating shaft 3a of the compression device 3, and the rotor 23 of the variable speed power source 10 on the same axis O1, the turbine system 1 can be more compactly designed, and further space reduction can be achieved.

Further, by disposing the planetary gear mechanism 11 and the variable speed power source 10 between the gas turbine 2 and the compression device 3, it is also possible to design the gas turbine system 1 more compactly and further space reduction can be achieved.

Furthermore, after stopping the operation of the gas turbine 2, since only the rotating shaft 2a of the gas turbine 2 can be rotated at a low speed by the variable speed power source 10, the starting device 4 can also be used as a turning device.

Furthermore, it is possible to adjust the ratio of the revolving speeds of the gas turbine 2 and the compression device 3, by appropriately adjusting the number of teeth of the sun gear 16, the planetary gear 17, and the internal gear 19, using the planetary gear mechanism 11. That is, the planetary gear mechanism 11 can function as an acceleration and deceleration device.

In the present embodiment, among the three rotating bodies 12 of the planetary gear mechanism 11, the sun gear 16 is connected to the gas turbine 2, the planetary carrier 18 is connected to the variable speed power source 10, and the internal gear 19 is connected to the compression device 3. However, the present invention is not limited to such a case, and the gas turbine 2, the variable speed power source 10, and the compression device 3 may be respectively connected to any one of the rotating bodies 12 in the planetary gear mechanism 11.

Here, the directions of rotation of the gas turbine 2 and the compression device 3 change by the difference in the rotating body 12 to which the gas turbine 2, the variable speed power source 10, and the compression device 3 are connected. Therefore, it is necessary to appropriately select the arrangement, the design, and the like of the gas turbine 2 and the compression device 3.

Further, the stopper 5 capable of regulating the rotational driving of the compression device 3 may not be necessarily provided. When starting the gas turbine 2, since the compression device 3 is in a state of being hard to rotate by its own load, it is possible to rotate the rotating shaft 2a of the gas turbine 2 even without the stopper 5.

Further, the variable speed power source 10 is not limited to a variable speed motor, but may be an internal combustion engine or the like.

Further, in the present embodiment, the compression device 3, the planetary gear mechanism 11, the variable speed power source 10, and the gas turbine 2 are arranged in this order from one side of the axis O1 toward the other side. However, the compression device 3, the variable speed power source 10, the planetary gear mechanism 11, and the gas turbine 2 may be arranged in this order from one side of the axis O1 toward the other side.

Second Embodiment

Figure 4:
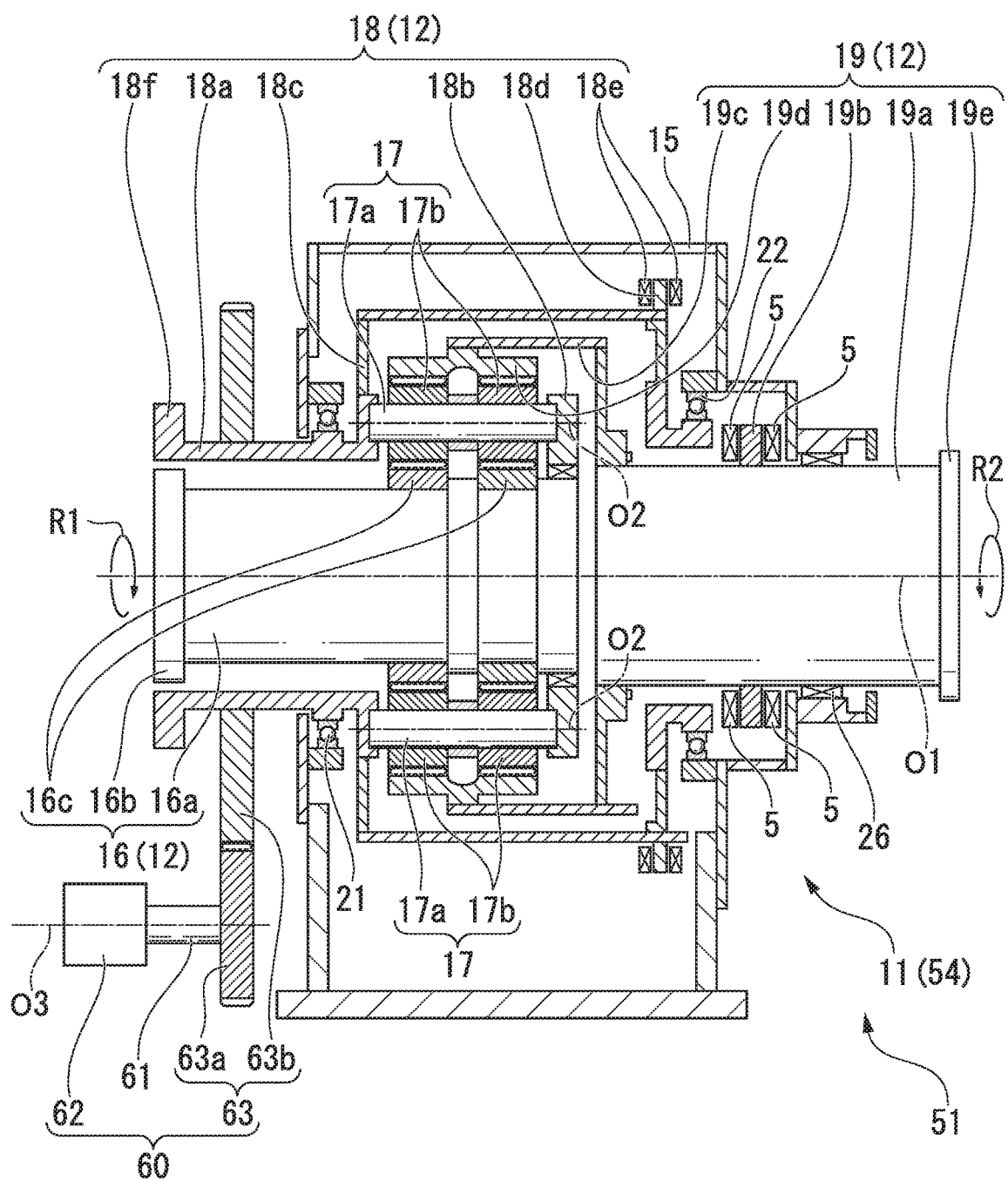
FIG. 4 is a schematic side view of a main part of a gas turbine system according to a second embodiment of the present invention.

Next, a second embodiment of the present invention will be described with reference to FIG. 4.

Constituent elements similar to those in the first embodiment are denoted by the same reference numerals, and a detailed description thereof will not be provided.

In the gas turbine system 51 of the present embodiment, the variable speed power source 60 of the starting device 54 is different from that of the first embodiment.

The variable speed power source 60 includes an output shaft 61, a power main body portion 62 that rotates the output shaft 61, and a driving force transmission unit 63 that transmits the rotational force to the planetary carrier 18 of the planetary gear mechanism 11.

The output shaft 61 and the power main body portion 62 are, for example, variable speed motors. The rotation center axis O3 of the output shaft 61 is disposed on the outer circumferential side of the axis O1 and is parallel to the axis O1.

The driving force transmission unit 63 includes a first gear 63a which is integrally provided on the outer circumferential surface of the tubular portion 18a of the planetary carrier 18, and a second gear 63b which meshes with the first gear 63a and is connected to the output shaft 61.

The first gear 63a and the second gear 63b are, for example, spur gears. Here, the transmission of the rotational force from the output shaft to the planetary carrier 18 may be performed, for example, by adopting a driving force transmission unit having a mechanism using a pulley and a belt, without being limited to the driving force transmission unit 63 having the aforementioned gear mechanism.

According to the aforementioned gas turbine system 51 of the present embodiment, as in the first embodiment, only the rotating shaft 2a of the gas turbine 2 can be rotated by the variable speed power source 60, using the planetary gear mechanism 11, without rotating the rotating shaft 3a of the compression device 3. Therefore, even if the output of the variable speed power source 60 is kept small, the gas turbine 2 can be started.

Therefore, since it is possible to reduce the size of the variable speed power source 60, while simplifying the structure, using the planetary gear mechanism 11, the structure of the starting device 54 can be simplified and downsized.

Although the embodiments of the present invention have been described in detail with reference to the drawings, the configurations, combinations thereof, and the like in each embodiment are merely examples, and additions, omissions, substitutions, and other changes of configurations may be made without departing from the spirit of the present invention. Also, the present invention is not limited by the embodiments, but is limited only by the scope of the claims.

INDUSTRIAL APPLICABILITY

In the above gas turbine starting device and gas turbine system, it is possible to achieve miniaturization and cost reduction, while simplifying the structure, using the planetary gear mechanism.

REFERENCE SIGNS LIST 1, 51 Gas turbine system
2 Gas turbine
2a Rotating shaft
2b Flange portion
3 Compressor (fluid machine)
3a Rotating shaft
3b Flange portion
4, 54 Starting device (gas turbine starting device)
5 Stopper
10, 60 Variable speed power source
11 Planetary gear mechanism
12 Rotating body
15 Casing
16 Sun gear
16a Shaft unit
16b Flange portion
16c Gear unit
17 Planetary gear
17a Shaft unit
17b Gear unit
18 Planetary carrier
18a Tubular portion
18b Disk-like portion
18c Large-diameter tubular portion
18d Annular protrusion
18e Planetary carrier stopper
18f Flange portion
19 Internal gear
19a Shaft unit
19b Annular protrusion
19c Support unit
19d Gear unit
19e Flange portion
20 Connecting shaft
20a Flange portion
23 Rotor (driving shaft)
23a Flange portion
24 Stator
25 Power source casing
21, 22, 26, 30, 31 Bearing
61 Output shaft
62 Power main body portion
63 Driving force transmission unit
63a First gear
63b Second gear
R1 Normal direction
R2 Reverse direction
O1 Axis
O2 Rotation axis
O3 Rotation center axis

The invention claimed is:

1. A gas turbine starting device comprising:
a planetary gear mechanism which is provided in a gas turbine system having a gas turbine, and a fluid machine rotationally driven by a driving force of the gas turbine on the same axis as a rotation center of a rotating shaft of the gas turbine, and has a sun gear, a planetary carrier disposed on an outer circumferential side of the sun gear, an internal gear having a gear unit and disposed on an outer circumferential side of the planetary carrier, and a planetary gear which is supported by the planetary carrier to mesh with the sun gear and the internal gear, the sun gear, the planetary carrier and the internal gear serving as rotating bodies rotating about the axis; and
a variable speed power source which has a driving shaft connected to rotate one of the rotating bodies, which is the sun gear, the planetary carrier, or the internal gear, in the planetary gear mechanism about the axis, and
a stopper which is configured to regulate rotation of the rotating body, which is the sun gear, the planetary carrier, or the internal gear, to which the rotating shaft of the fluid machine is connected, until the rotational speed of the rotating shaft of the gas turbine becomes equal to or higher than a self-sustained rotational speed of the gas turbine,
wherein the rotating shaft of the gas turbine is connected to rotate one of the rotating bodies, which is the sun gear, the planetary carrier, or the internal gear, other than the rotating body, to which the variable speed power source is connected, about the axis,
a rotating shaft of the fluid machine is connected so that the remaining one of the rotating bodies, which is the sun gear, the planetary carrier, or the internal gear, other than the rotating bodies, to which the driving shaft of the variable speed power source and the rotating shaft of the gas turbine are connected, is rotated about the axis,
an annular protrusion is formed to protrude annularly from an outer circumferential surface of a shaft unit of the internal gear, and
the stopper is configured to sandwich the annular protrusion by two sides of the annular protrusion in a direction along the axis.

2. A gas turbine system comprising:
the gas turbine starting device according to claim 1;
the gas turbine started by the gas turbine starting device; and
the fluid machine driven by driving force of the gas turbine.

3. The gas turbine system according to claim 2, wherein a rotation center of the rotating body, which is the sun gear, the planetary carrier, or the internal gear, in the planetary gear mechanism, a rotation center of the rotating shaft of the gas turbine, and a rotation center of the rotating shaft of the fluid machine are disposed on the same axis.

4. The gas turbine system according to claim 3, wherein the rotation center of the driving shaft of the variable speed power source and the rotation center of the rotating body, which is the sun gear, the planetary earlier, or the internal gear, in the planetary gear mechanism are disposed on the same axis.

5. The gas turbine system according to claim 4, wherein the planetary gear mechanism and the variable speed power source are disposed between the gas turbine and the fluid machine.

* * * * *